Oct. 13, 1964  W. B. EDDISON ETAL  3,152,943
LABEL APPLYING APPARATUS
Filed March 1, 1961  11 Sheets-Sheet 1

INVENTOR.
WILLIAM BARTON EDDISON
WARREN E. ERICKSON
BY
*Andrus & Starke*
Attorneys

INVENTOR.
WILLIAM BARTON EDDISON
WARREN E. ERICKSON
BY

Andrus & Starke

Attorneys

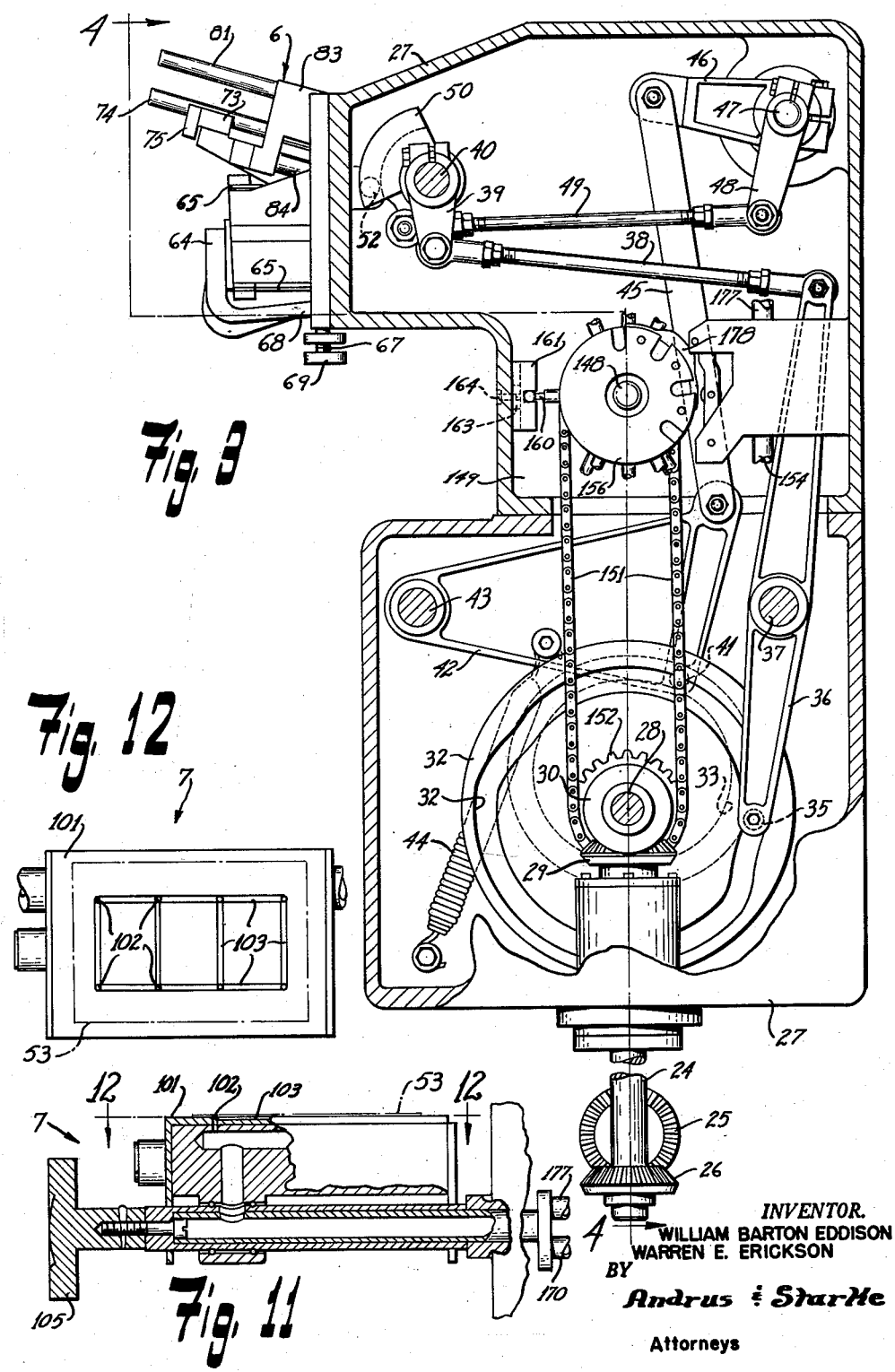

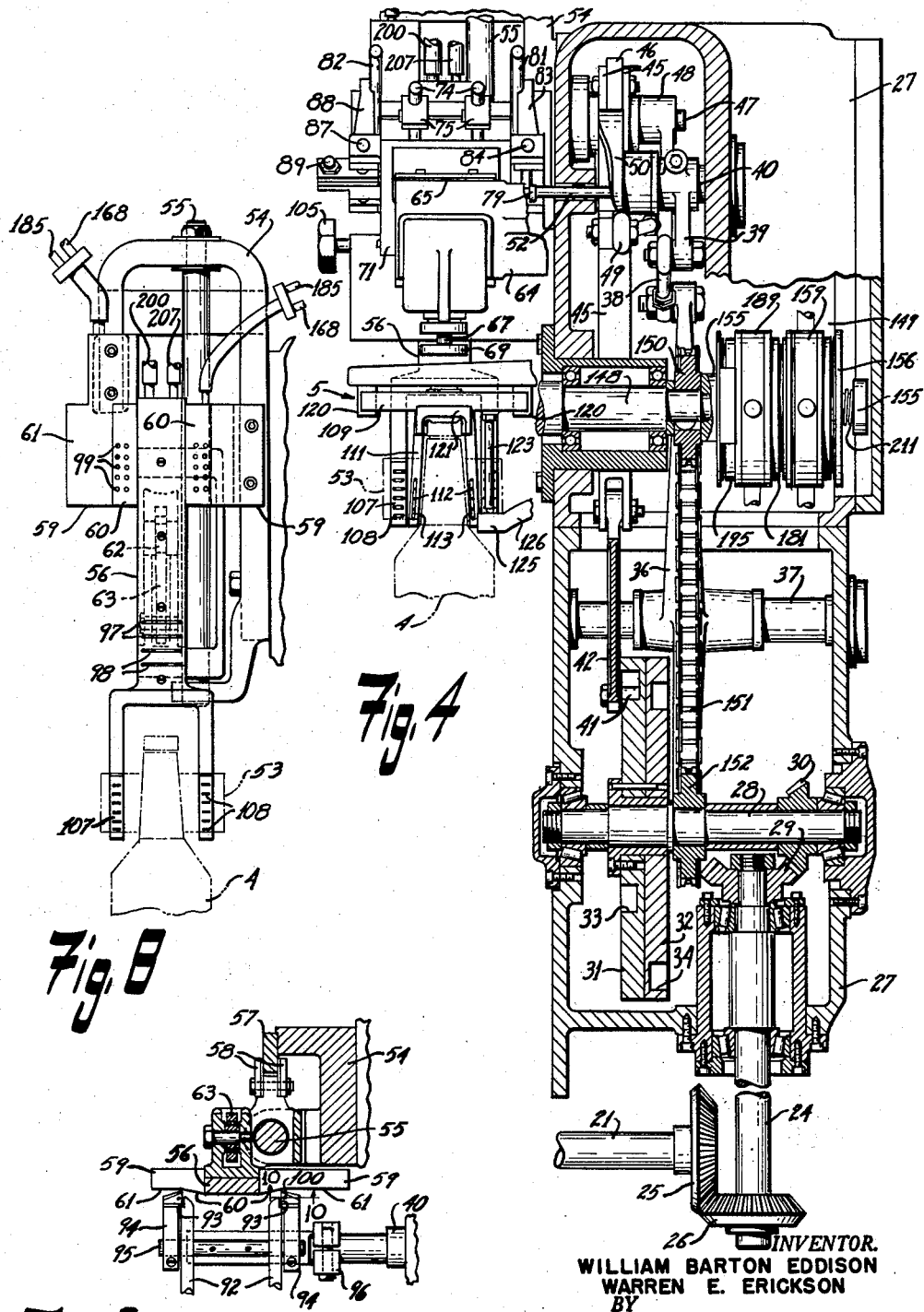

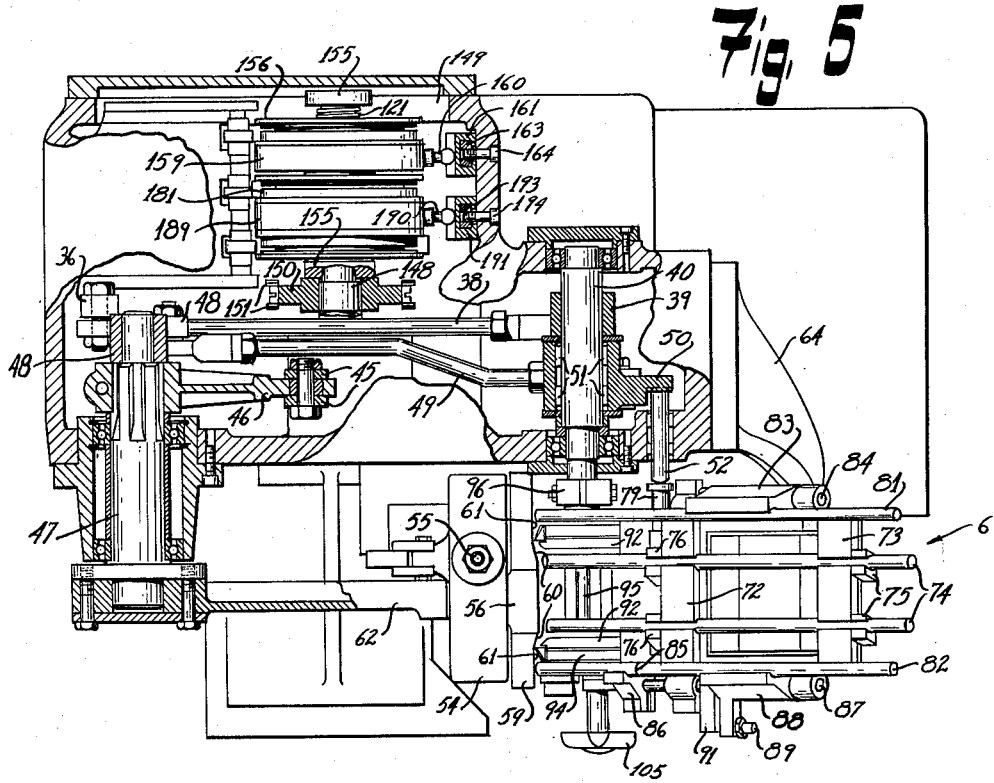

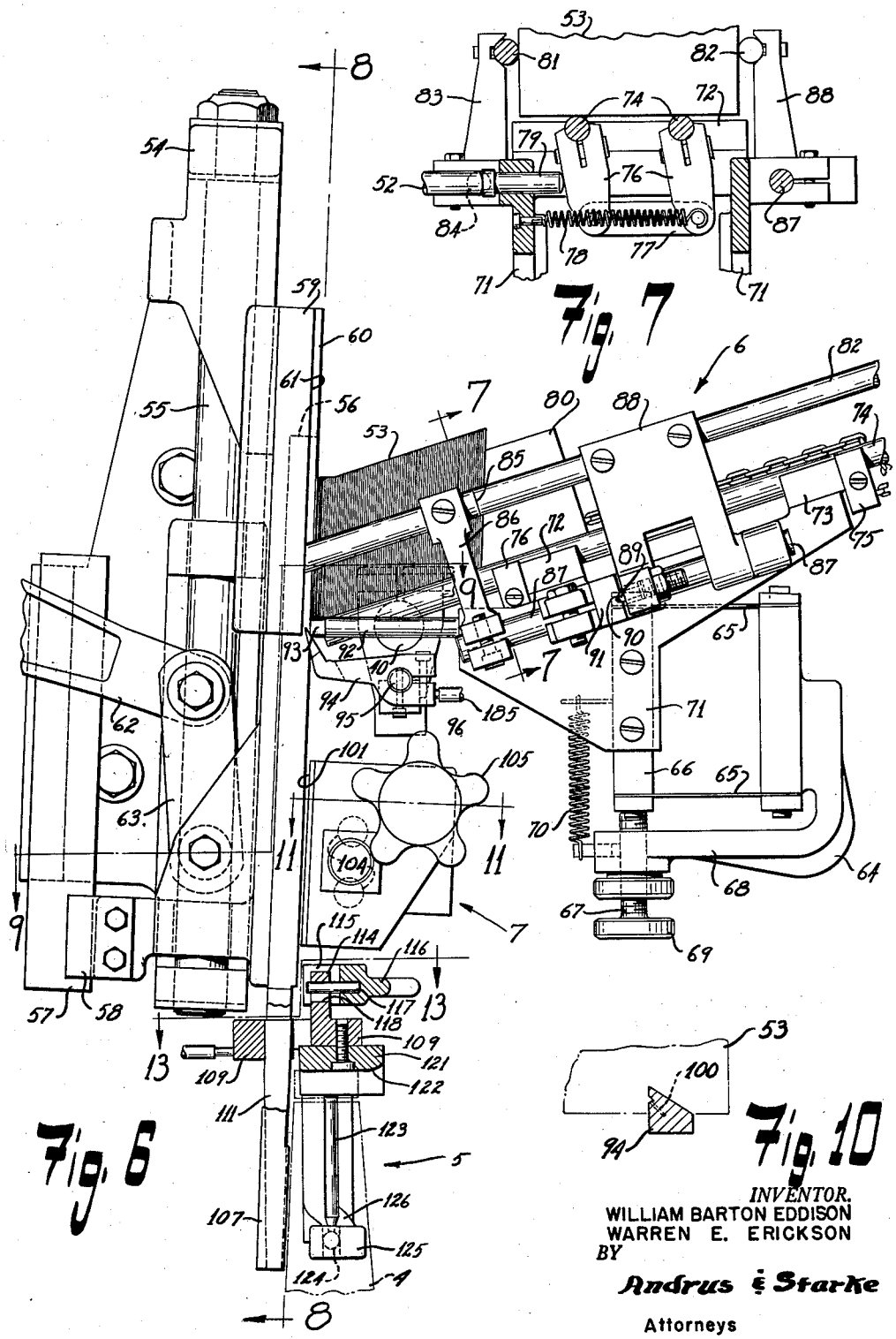

INVENTOR.
WILLIAM BARTON EDDISON
WARREN E. ERICKSON
BY

*Andrus & Starke*

Attorneys

Oct. 13, 1964  W. B. EDDISON ETAL  3,152,943
LABEL APPLYING APPARATUS

Filed March 1, 1961  11 Sheets-Sheet 9

INVENTOR.
WILLIAM BARTON EDDISON
WARREN E. ERICKSON
BY
Andrus & Starke
Attorneys

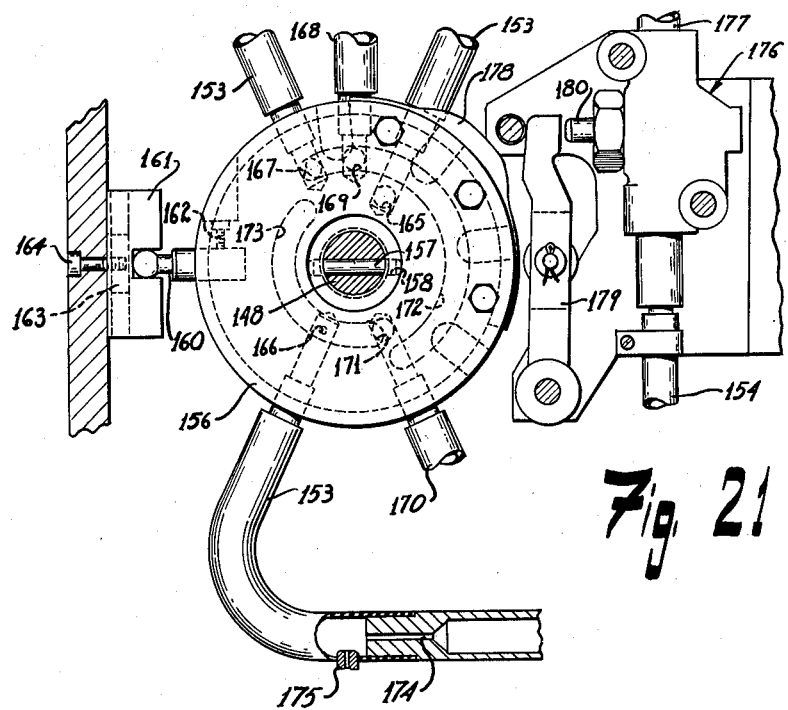

United States Patent Office 3,152,943
Patented Oct. 13, 1964

3,152,943
LABEL APPLYING APPARATUS
William Barton Eddison, New York, N.Y., and Warren E. Erickson, Madison, Wis., assignors, by mesne assignments, to Thatcher Glass Manufacturing Company, Inc., New York, N.Y., a corporation of New York
Filed Mar. 1, 1961, Ser. No. 92,697
28 Claims. (Cl. 156—483)

This invention relates to a label applying apparatus, and more particularly to a machine for applying labels to articles designed to have a label attached thereto.

In the removal of labels from a magazine, problems have arisen in connection with proper separation of each successive label from the rest of the pack. This has proved true in handling paper labels which are to be wrapped around the neck of a bottle. When the adhesive labels are of the new heat seal or so-called thermoplastic variety, difficulties have been encountered in handling the labels to permit a fast application of heat without losing control of the label.

In addition, bottles of the type used for liquor and the like are not manufactured to within extremely close tolerances, a $\frac{1}{16}''$ variance in height and some tilting of the neck from the vertical not being uncommon.

The present invention solves the aforementioned and other problems and provides a complete machine capable of accurately wrapping paper labels around bottle necks at a rate approximating 180 per minute. The magazine feed device and label truing and applying devices utilize concepts and features previously unknown in the art in connection with any type of label. Furthermore, the apparatus facilitates heat application to and handling of heat seal paper labels.

The accompanying drawings illustrate the best mode presently contemplated by the inventors for carrying out the invention.

In the drawings:

FIG. 3 is a rear elevation of the upper portion of the drive element shown in FIG. 2, with parts broken away and in section;

FIG. 4 is a section taken generally along line 4—4 of FIG. 3, with parts broken away and in section;

FIG. 5 is a section taken generally along line 5—5 of FIG. 1, with parts broken away and in section;

FIG. 6 is a front elevation of the label magazine, heater and transfer apparatus;

FIG. 7 is a section of the label magazine taken on line 7—7 of FIG. 6, with parts broken away and in section, and showing the label supporting mechanism;

FIG. 8 is a vertical section taken on line 8—8 of FIG. 6, and showing the vertical label transfer apparatus;

FIG. 9 is a section of the spears and pick-off mechanism, taken generally on line 9—9 of FIG. 6, with parts in section;

FIG. 10 is an enlarged view of the end of a spear taken on line 10—10 of FIG. 9 and showing the spear position relative to the label;

FIG. 11 is a section taken generally along line 11—11 of FIG. 6, with parts broken away and in section and showing the label heater and additionally showing a label in phantom view disposed thereon;

FIG. 12 is a view of the heater face plate taken along line 12—12 of FIG. 11 and also additionally showing a label in phantom view disposed thereon;

FIG. 13 is a section of the lower fork assembly, taken on line 13—13 of FIG. 6;

FIG. 14 is a vertical section of the fork assembly, taken generally along line 14—14 of FIG. 13;

FIG. 21 is a vertical section of the valving mechanism in elevation taken along line 21—21 of FIG. 20;

FIG. 22 is a view similar to FIG. 21, taken on line 22—22 of FIG. 20, and showing the center compressed air valving mechanism;

Figure 1:
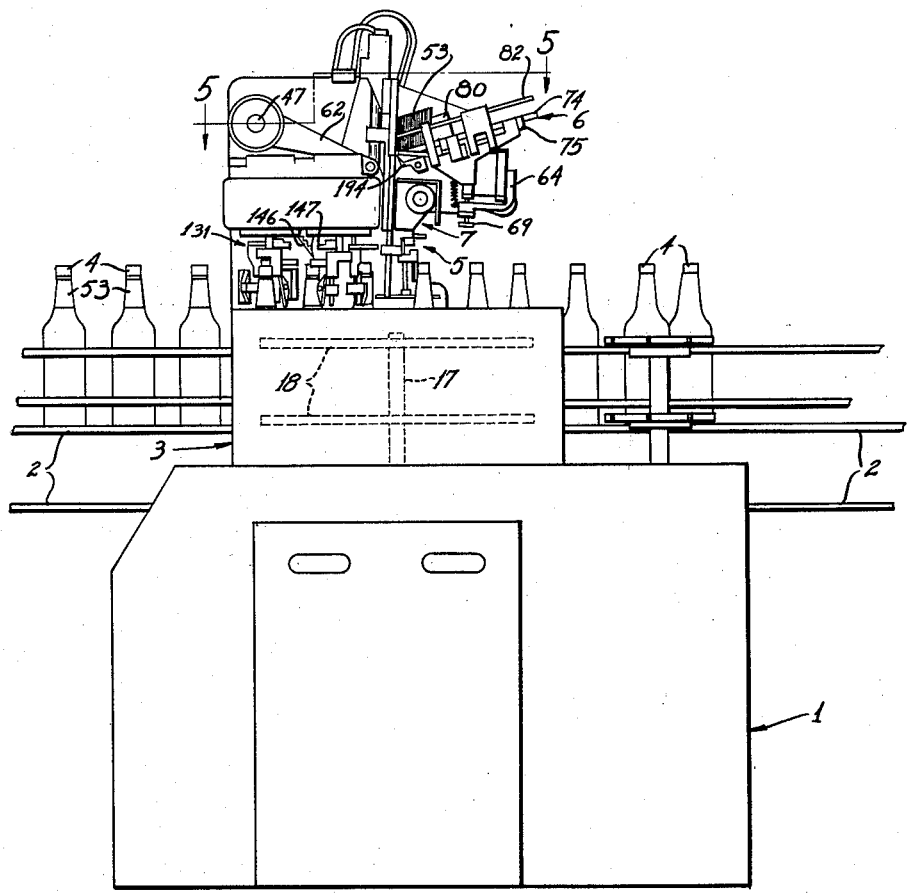
FIG. 1 is a front elevation of a machine constructed in accordance with the invention, and showing the basic components thereof.

As shown in FIG. 1 of the drawings, the machine comprises a frame 1 which supports the drive mechanism, a longitudinal conveyor 2, and a circular table assembly 3 for carrying a stream of bottles 4 along a predetermined path through the label applying mechanism 5. The machine also carries a label magazine feed assembly 6 and label surface activator or heater assembly 7.

Figure 2:
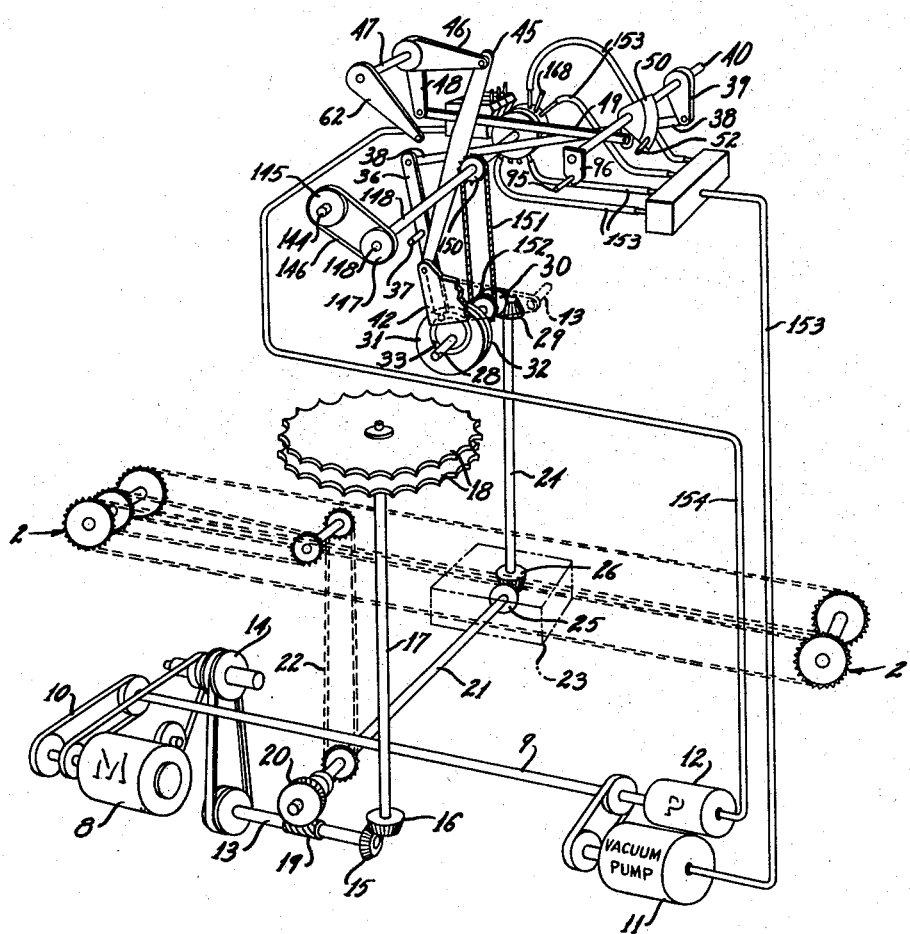
FIG. 2 is a schematic view of the machine drive and portions of its driven elements.

As shown schematically in FIG. 2, the machine drive mechanism comprises a motor 8 of any suitable well-known type carried within and by frame 1 and adjacent one end thereof. Motor 8 drives a shaft 9 through a belt 10, with shaft 9 in turn driving a vacuum pump 11 and compressed air pump 12 for purposes to be described.

In addition, motor 8 drives a longitudinally extending shaft 13 through a clutch 14. One end of shaft 13 mounts a bevel gear 15 which meshes with a bevel gear 16 on the lower end of the vertical shaft 17 for the bottle carrying table 18.

Portions of the above drive are similar to the drives shown in applicants' copending applications Serial Nos. 803,402 (now Patent No. 2,986,859) and 803,406 (now Patent No. 2,987,163), filed April 1, 1959, and assigned to the same assignee. Clutch 14 may be of the same type as that disclosed in Patent No. 2,987,163, and a spotting device, not shown, similar to that disclosed in Patent No. 2,987,163 may also be utilized.

In addition, a metering wheel and intake pocket wheel, not shown, may be utilized to properly space bottles 4 and sweep them into table 18. Such devices are disclosed in applicants' issued Patent No. 2,909,017, assigned to the same assignee.

Shaft 13 is provided with a worm 19 which meshes with a worm gear 20 keyed to the forward portion of a transverse shaft 21. Conveyor 2 is shown as driven by a suitable sprocket and chain connection 22 from shaft 21.

The rearward end of shaft 21 extends into a miter box 23 carried at the rear of the machine and drives a vertical shaft 24 through bevel gears 25 and 26. The upper end of shaft 24 extends into a box-like chamber 27 which is secured to frame 1.

Chamber 27 contains a rotatable horizontal shaft 28 driven from shaft 24 by suitable bevel gears 29 and 30 (FIGS. 2, 3 and 4). A pair of disc-like cams 31 and 32 are mounted in back-to-back relation for rotation with shaft 28. Cams 31 and 32 provide the reciprocating action necessary for operation of magazine assembly 6, and for this purpose have cam grooves 33 and 34, respectively, thereon.

Right cam groove 34 receives a roller-type follower 35, the latter being secured to one end of a generally straight and vertically extending lever arm 36 which is pivoted about a central shaft 37. A connecting rod 38 pivotally joins the upper end of arm 36 with a rocker member 39 secured to a horizontal rocker shaft 40. Rotation of cam 32 by motor 8 will therefore cause shaft 40 to rock back and forth, for purposes to be described.

Left cam groove 33 receives a roller-type follower 41, the latter being secured to a generally triangularly shaped lever 42 which is pivoted about a shaft 43. For purposes of cam following accuracy, a spring 44 is secured between the wall of chamber 27 and lever 42.

Lever 42 is pivotally connected through a link 45 and lever 46 to rotate a transverse horizontal shaft 47. Another lever 48 is mounted for rotation with shaft 47 and pivotally connects through a connecting rod 49 to a cam 50 mounted on bearings 51 for rotation about rocker shaft 40. Cam 50 is provided with an arcuate portion of diminishing thickness to provide a face adapted to be followed by a magazine actuator rod 52 mounted on the wall of chamber 27, as will be described more fully hereinafter.

Label Handling

Supply magazine assembly 6 is adapted to present a plurality of labels 53, one at a time, in succession, to a pick-off apparatus. (See FIGS. 3–7.) For this purpose, an inverted hook-shaped upstanding bracket 54 is mounted on the rear portion of frame 1. Bracket 54 secures a vertical shaft 55 which acts as a guide bearing for a vertically extending label pick-up slide 56 mounted for movement on the shaft laterally of the magazine (FIGS. 6, 8 and 9). Rotation of slide 56 about shaft 55 is prevented by a vertical guide member 57 mounted on bracket 54 and which is received between a pair of spaced plates 58 secured to a portion of slide 56.

To assist in the pick-off operation, a pair of deformer plates 59 are secured to bracket 54 on each side of and closely adjacent slide 56. The inner edges of plates 59 are of substantially the same thickness as the main portion of the slide, and taper outwardly therefrom along a rear wall or face 60 at an inclined angle of approximately 20 degrees, with the taper terminating in a straight face 61, for purposes to be described.

Slide 56 is moved vertically between plates 59 by a crank arm 62 which is secured at one end for rotation with shaft 47 and which pivotally connects through a link 63 to the slide. Rotation of cam 31 by motor 8 will therefore cause actuator rod 52 and slide 56 to be operated in unison.

For purposes of holding and feeding a pack of labels 53 to the pick-off apparatus, magazine assembly 6 comprises a bracket 64 secured to the rear of frame 1 and spaced behind slide 56. A pair of vertically spaced horizontal flat springs 65 are secured to bracket 64 and extend forwardly to a vertical spacer plate 66 which rests on a vertical pin 67 threadably mounted in an arm extension 68 of bracket 64. The height of plate 66 can be varied by rotating a knob 69 on the lower end of the pin. Spacer plate 66 is tensioned against pin 67 by a vertical spring 70 secured between extension 68 and the plate.

A bracket 71 is secured to plate 66 and includes an upper portion which tilts downwardly toward slide 56. Bracket 71 serves to secure a pack of labels 53 on edge, and for this purpose includes a pair of front and rear spaced retainers, 72 and 73, respectively, which support a pair of spaced transverse label support rods 74. As shown, rods 74 extend forwardly on a downwardly inclined angle from the rear end of bracket 71 to closely adjacent deformer plates 59.

Retainers 72 and 73 loosely hold rods 74 in position, and a stop member 75 is clamped to each rod behind retainer 73 to prevent downward sliding movement of the rod.

The upper end of a lever 76 is clamped to each rod 74 just forwardly of retainer 72, with levers 76 extending downwardly and secured for simultaneous pivoting movement by a link 77. A spring 78 is secured between link 77 and bracket 71 so that levers 76 will be biased toward a pusher 79 in the bracket wall and which is engaged at its inner end by one of the levers. The outer end of pusher 79, in turn, is in engagement with the outer end of magazine actuator rod 52.

Thus, rocking motion of cam 50 will cause rod 52 and pusher 79 to reciprocate, which will in turn cause label support rods 74 to rock on their axes. This motion assures that the pack of labels will move downwardly toward slide 56 as each label is removed, and counteracts any friction between the label edges and the support rods.

A weight block 80 which slides on rods 74 may also be utilized behind the pack of labels to urge them towards slide 56.

During operation of the apparatus, as a pack of labels 53 slides down rods 74 toward slide 56, the side edges of the labels are held in position by a pair of upper rods 81 and 82 which are spaced apart a greater distance than support rods 74. As shown, rod 81 is fixedly supported by a bracket 83 which is clamped at its lower end to a transverse shaft 84 clamped to bracket 71.

For purposes of easy insertion of a pack of labels, rod 82 is separated into a lower portion and an upper portion at a joint 85. The lower portion is fixedly clamped to the upper end of a small bracket 86, the lower end of which is clamped to a shaft 87, similar to shaft 84.

The upper portion of rod 82 is fixedly clamped to the upper end of a large bracket 88 and the lower end of bracket 88 is mounted for pivoting movement on shaft 87. The two portions of rod 82 are normally kept in alignment by an adjustable spring plunger 89 disposed in the lower end of bracket 88, the plunger normally entering a centering groove 90 in a block 91 connected to bracket 71. However, manual pressure will permit plunger 89 to spring out of groove 90 so that the upper end of rod 82 can be pivoted outwardly and downwardly about shaft 87.

As labels 53 move downwardly on rods 74, they are prevented from falling backwards by block 80. A pair of horizontal guide rails 92 are secured to bracket 71, with the rails being disposed just outwardly of rods 74 and extending slightly therebeyond. As best seen in FIGS. 6 and 9, rails 92 terminate forwardly of a plane containing the rear face of slide 56 and slightly outwardly of tapered faces 60. As labels 53 reach the end of rods 74, they immediately move onto rails 92.

The end of each rail 92 is cut away, as at 93, for purposes of reducing friction with the label pack to a minimum and for permitting a positive label separator spear 94 to pass as close to the rod axis as possible (FIGS. 6, 9 and 10). Spears 94 are mounted outwardly of rails 92 on a shaft 95 which in turn is secured in a bracket 96 mounted for rotation with rocker shaft 40. Rotation of cam 32 thus causes spears 94 to be pivotally raised and lowered from beneath the label pack.

The lower portion of slide 56 contains a plurality of vacuum air flow openings 97 which are connected together by grooves 98 to spread the vacuum effect. Similarly, vacuum and air is supplied to a plurality of air flow openings 99 in tapered faces 60 of deformer plates 59.

The end label is removed from the magazine as follows: When slide 56 is at its lowermost position, so that openings 97 are substantially below openings 99, vacuum is supplied to the latter, which causes the pair of opposite edge portions of the end label to be attracted onto tapered faces 60 and held across the face of slide 56. The travel distance of the said opposite edge portions is substantially greater than the travel of the central portion, due to the taper. Since the weight of the label is generally toward the center, there is little frictional resistance to this deforming movement. The angle of the taper has been found to be an optimum which resists following of the ends of the next adjacent label.

In order to assure that the next adjacent label is not removed with the end label, each spear 94 now rises upwardly in the space of greatest separation of the label ends, i.e., between the axis of its respective guide rail 92 and tapered face 60. The points of the spears extend above rails 92 so that the next adjacent label cannot be removed with the end label.

Slide 56 is raised by crank arm 62 to dispose openings 97 adjacent openings 99, and vacuum is then applied at openings 97 to secure the central portion of the label to the slide. The central portion of the next adjacent label may tend to follow the center of the end label.

Once the end label 53 is securely held on slide 56 and separated from the next label, the vacuum at deformer openings 99 is replaced with a blast of air and crank arm 62 moves slide 56 downwardly.

It has been found that in some applications, the labels should be made of relatively soft paper. Since the center of the second label tends to follow the center of the end label, the downwardly moving end label may tend to frictionally pull the second label downwardly against guide rails 92 and distort it. To prevent this occurrence, a small jet opening 100 is disposed in the end portion of each spear 94, with the openings being directed inwardly to between the center of the end and second labels. The air passing through openings 100 is timed with the air jet at deformer openings 99, and provides a lubricating cushion of air between the labels to thereby keep their central portions separated.

Where the labels are of the thermoplastic or heat seal type, the slide stops so that the label is disposed adjacent the face plate 101 of heater 7 mounted on frame 1 (FIGS. 6, 11 and 12).

Face plate 101 is provided with a plurality of air flow openings 102 connected by the usual grooves 103, and a high vacuum is initially applied to suck the label from slide 56 onto the plate. Simultaneously, vacuum is cut off on the slide, and a jet of air supplied to assist in removing the label therefrom.

The chemically treated adhesive thermoplastic face of the label is positioned against plate 101, which supplies the heat so that the said face becomes tacky. It has been found that a heater which maintains plate 101 at about 325° may be suitable.

The heater 7 may be of any desired type, that shown including a plurality of electric resistance heating elements 104. The heater may be removed by turning a knob 105.

As label 53 heats up, the high vacuum automatically switches to low vacuum in a manner to be described, so that the label will not be pulled into the interconnecting grooves 103 and distorted on plate 101 thereby. At the same time, slide 56 moves upwardly to pick up another label from magazine assembly 6, and a vertical fork 107 secured to the lower end of the slide is raised into position adjacent the heated label.

After the label is sufficiently tacky for application to a bottle, vacuum at openings 102 is replaced with a sudden blast of air which causes the label to pop off from face plate 101. The amount of air is sufficient to overcome the adhesive forces at the plate caused by the heated thermoplastic coating.

The printed side of the label is immediately attracted to fork 107 by a vacuum which is applied through connected air flow openings 108 in the fork, and subsequent lowering of slide 56 lowers the heated label into the bottle path.

Manufacturers utilizing a wrap-around label anywhere on a bottle desire that the label be square with the bottle and that each label be properly positioned heightwise. Since bottles vary dimensionally in height and from the vertical, due to large manufacturing tolerances, proper placing of the label is difficult.

The present inventors have found that the problems involved in adjusting a bottle moving on a conveyor so that it will be correctly positioned relative to a label to be applied, are substantial. The present invention completely overcomes this difficulty.

For this purpose fork 107, which cannot move other than vertically, is lowered within a guide frame or floating yoke 109 which extends transverse to the conveyor just above the stream of bottles (FIGS. 4, 6, 13 and 14). In order to transfer the label from fork 107, yoke 109 has a centrally mounted support 110 which carries a downwardly extending fork 111. Fork 111 is slightly narrower than fork 107 and is positioned so that when fork 107 is in lowered position the prongs of the two forks overlap, and are positioned on each side of the bottle path center line, as shown in FIG. 4.

Fork 111 also is provided with a plurality of vertically extending vacuum air flow openings 112 in the same transverse plane as openings 108, with the openings in fork 111 being joined by a single vertical groove 113 for label securing and alignment purposes, as will be described.

In view of the overlapping nature of the forks, label 53 is transferred without movement out of the transverse plane containing the forks, by switching vacuum from openings 108 to openings 112. Compressed air is also applied at openings 108. Slide 56 then raises fork 107 and the label is ready for application to a bottle, being directly in the path thereof.

The invention contemplates truing of each label to its respective bottle. For this purpose, yoke 109 is provided with a centrally disposed upwardly extending bracket 114 which extends into a slot 115 disposed in a forwardly extending arm portion 116 of frame 1. A pin 117 extends through slot 115 and through a hole 118 in bracket 114 which is substantially larger than the pin.

Yoke 109 is normally centered on the axis of conveyor 2 by a pair of opposed spring plungers 119 adapted to engage each side edge of bracket 114. In addition, a pair of spaced guide plates 120 extend downwardly and engage the slotted ends of yoke 109 to prevent any movement thereof in the direction of bottle travel. Yoke 109 and fork 111 can thus only move in a plane transverse to the conveyor and in a rocking motion on pin 117.

A locator member 121 of polytetrafluoroethylene or other low friction material is centrally mounted beneath yoke 109 between fork 111 and the oncoming bottles with the locator having at longitudinal passageway 122 adapted to permit the top of a bottle 4 to pass therethrough. Passageway 122 is generally rectangular and is dimensioned to be as close to the bottle top dimensions as possible.

It is desirable that the surfaces of passageway 122 are normally positioned in accordance with the minimum dimensional tolerances of the stream of bottles, so that the position of yoke 109 is always a gauge of bottle height and angle.

In addition, guide rod 123 is secured within the rearward end portion of yoke 109 and extends downwardly therefrom. The lower end of rod 123 is formed into a ball 124 disposed in a guide opening in a support member 125 secured to an arm 126 on frame 1. Under normal conditions the yoke is supported on pin 117.

As a bottle enters passageway 122, it will raise yoke 109 and fork 111 by the amount of height above the minimum bottle tolerance. At the same time, if the bottle or neck is tilted out of the vertical, it will force locator 121, yoke 109 and fork 111 to tilt accordingly. The label on fork 111 will thus be raised and tilted in a transverse plane so that it is true to the incoming bottle. Any such tilting will cause rod 123 and thus ball 124 to pivot in the opening.

Figure 15:
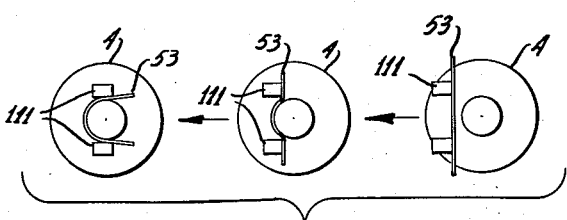
FIG. 15 is a schematic top plan view of a bottle showing the various stages of label pick-up at the fork assembly.

As best shown in FIG. 15, as the bottle top emerges from passageway 122, the neck of the bottle engages the tacky side of label 53 and proceeds to pass between the prongs of the trued fork 111. No matter what the height or angle of the bottle, the top of the label will always be the same distance from the bottle lip and will be square with the bottle neck.

As the bottle neck proceeds through fork 111 it will pull label 53 between the prongs and off the fork. Since the label is tacky, it will adhere to a portion of the forward periphery of the neck, and is assisted therein by the pull created by the vacuum which is left on at openings 112, and connected through grooves 113.

As the bottle proceeds out of fork 111, it will release locator 121 for receipt of the next bottle, and fork 111 will be ready to receive another label from fork 107.

Figures 18, 19:
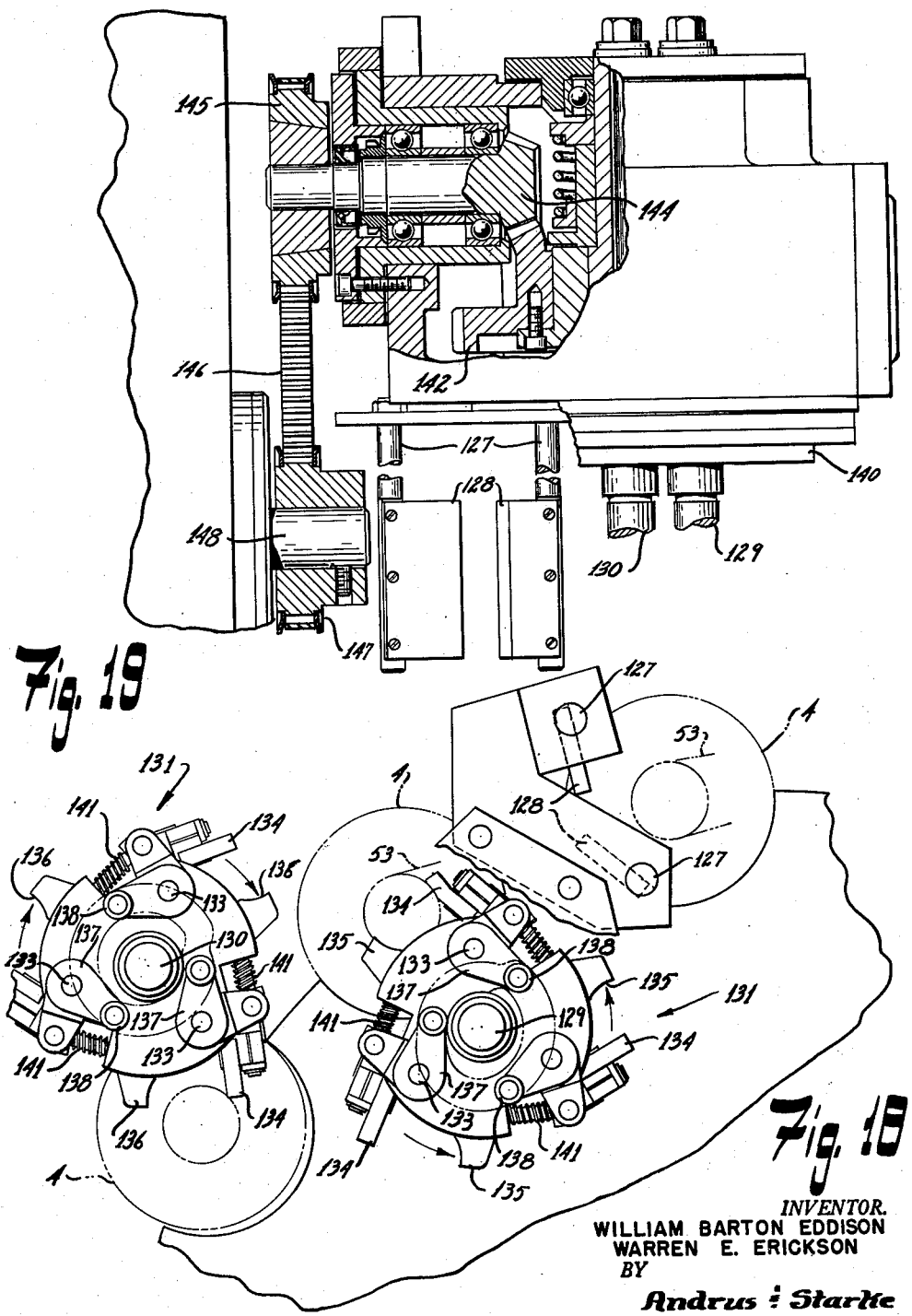
FIG. 18 is a horizontal section taken generally along line 18—18 of FIG. 16.
FIG. 19 is a vertical section of the drive for the rotary wipers, taken generally along line 19—19 of FIG. 16, and with parts broken away and in section.
Figure 23:
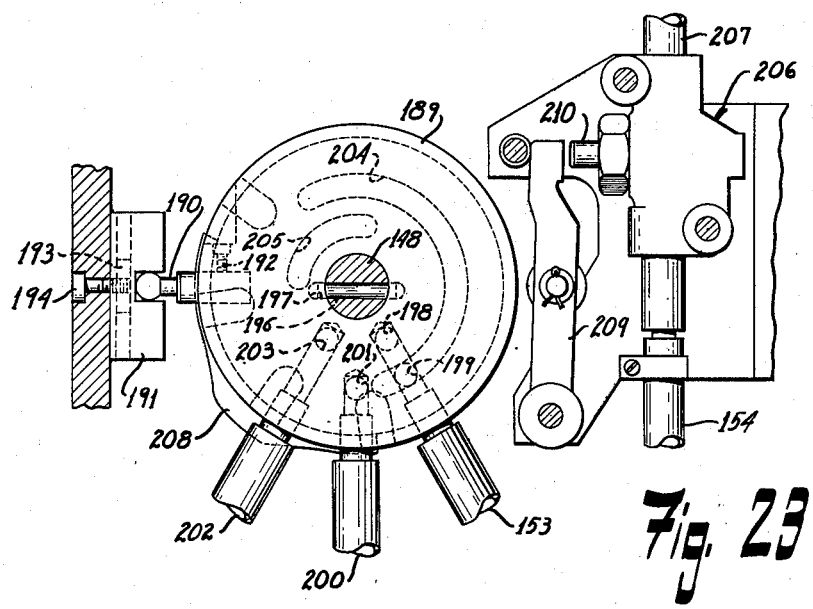
FIG. 23 is a view similar to FIG. 21 taken on line 23—23 of FIG. 20.
Figure 20:
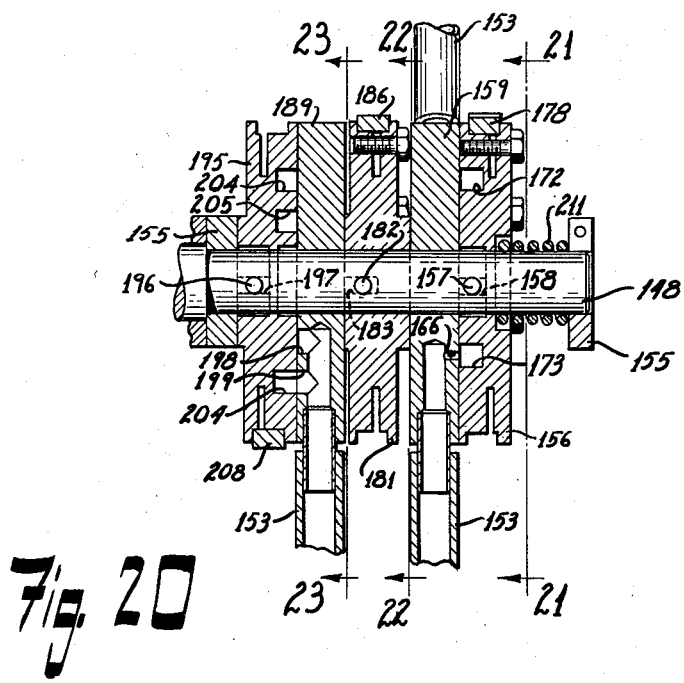
FIG. 20 is a vertical section of the valving mechanism shown in FIG. 4.

In this point of the operation, the label is only applied to the forward 180° of the bottle neck. This portion is now applied more securely, and the wrap-around operation extended to approximately 240°. For this purpose, a pair of transversely spaced rods 127 extend downwardly from the machine frame, with each rod carrying a resilient wiper 128 of rubber or other suitable material (FIG. 18). Wipers 128 extend into the bottle path so that the neck passes therebetween. The wipers apply circumferential frictional tension to each label and securely wipe it around the forward peripheral portion of the neck and also around a portion of the rearward peripheral portion. Since the wipers are resilient, they will properly perform regardless of variation in bottle shape.

Figure 16:
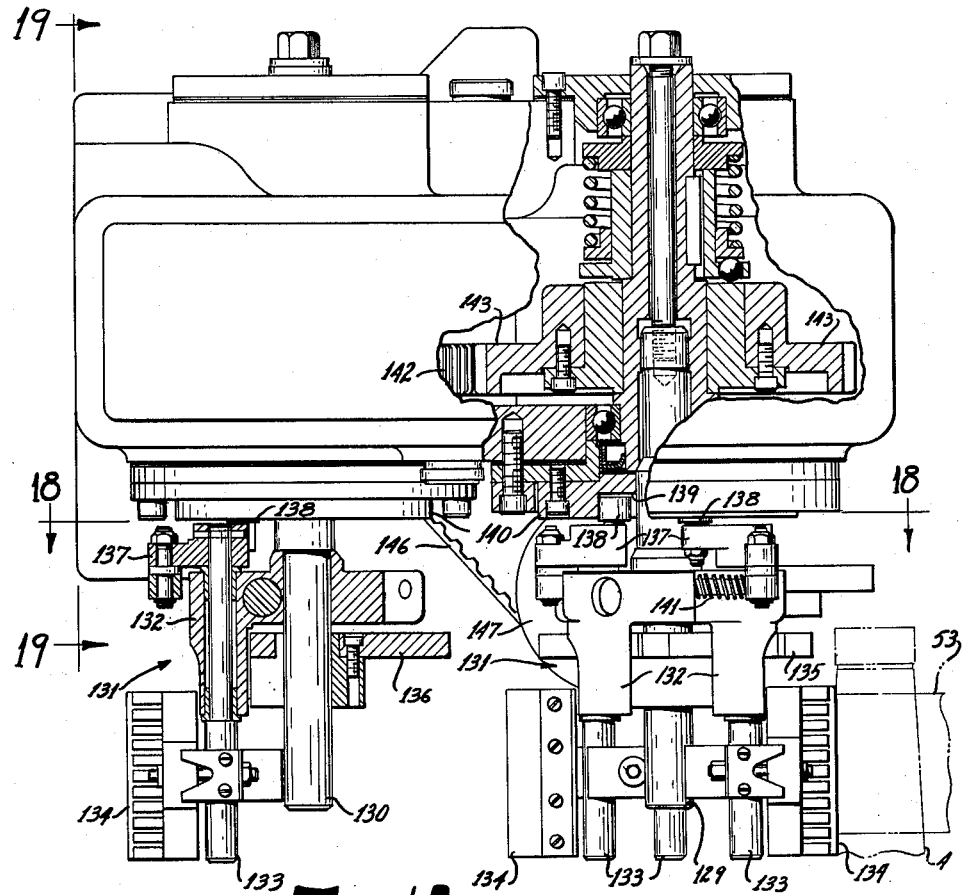
FIG. 16 is a front elevation of the label wiping mechanism with parts broken away and in section.
Figure 17:
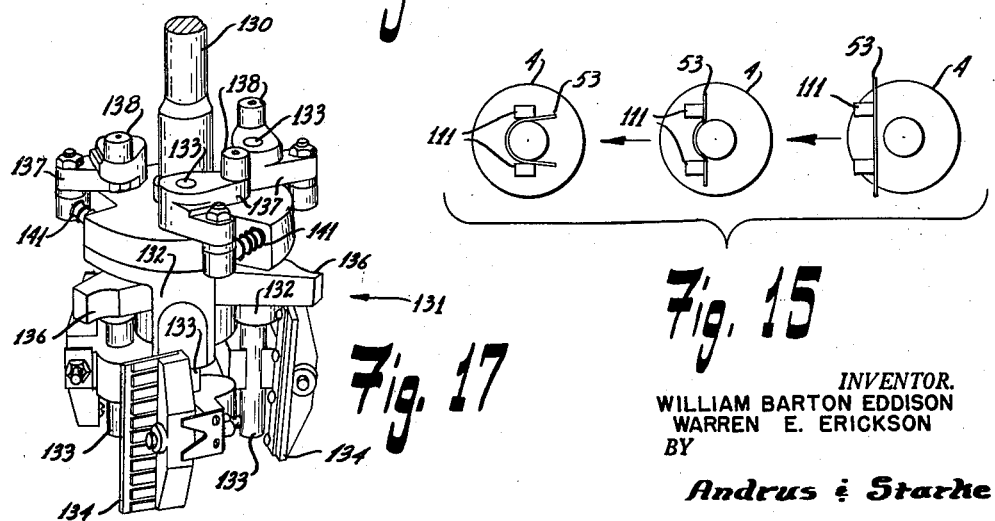
FIG. 17 is a perspective view of the final rotary label wiper.

The final step in label applying is accomplished by a rotary wiper assembly disposed directly after wipers 128 in the path of bottle movement (FIGS. 16–18). The assembly comprises a pair of oppositely rotating drive shafts 129 and 130, with shaft 129 rotating counterclockwise and being disposed above the edge of table 18, and shaft 130 rotating clockwise and being spaced outwardly from the edge of table 18. Shaft 129 is disposed closer to wipers 128 than is shaft 130.

Each shaft carries a spider-like bracket member 131 for rotation therewith, with each spider having three circumferentially spaced downwardly extending arms 132 which contain a vertical rocker rod or shaft 133 therein. The lower end of each shaft 133 has clamped thereto a vertical wiper 134 of polytetrafluoroethylene or other relatively hard, rigid material of low frictional characteristics.

As a bottle 4 leaves wipers 128 it will pass between shafts 129 and 130. As it approaches shaft 129 it will engage a bottle retainer 135 rotating with the shaft. A wiper 134 will then be moved up against the label and wipe the free trailing rearward end of the label onto the following peripheral portion of the bottle. Wiper 134 will then retract. Just as this is completed, the bottle will be released from retainer 135 and will engage a similar retainer 136 on shaft 130, and a similar wiper 134 will wipe the remaining free trailing end of the label onto the bottle. The last end of the label may overlap the first end, if desired.

Wipers 134 are timingly brought into engagement with the bottles and retracted therefrom through a lever 137 fixed to rotate with the top end of each rocker shaft 133. One end of each lever carries a roller type follower 138 which rides in a circular cam groove 139 in a plate 140 fixedly mounted beneath a portion of frame 1 and concentric with the respective drive shaft. The other arm of lever 137 carries a spring 141 which is biased against a portion of spider 131. To prevent bottle breakage during label wiping, groove 139 is wider than the diameter of followers 138, and spring 141 serves to bias the wiper 134 against the bottle neck.

Wipers 134, being relatively rigid and in strip form, provide a vertical line contact with the labels and apply high unit pressure thereto. The line contact prevents forcing the label into any minute pockets or undulations which may exist in the bottle wall.

For purposes of rotation of the two wiper assemblies, shafts 129 and 130 extend upwardly into a frame housing where they are driven in opposite directions by a pair of meshing gears 142 and 143, respectively (FIGS. 16 and 19). Gear 142 also meshes with a horizontal pinion bevel gear 144 on which is mounted a sprocket 145. Sprocket 145 connects a generally upwardly extending timing belt 146 with another sprocket 147 on the end of a valve drive shaft 148 disposed above cam shaft 28 in a valve chamber 149. A second sprocket 150 is keyed centrally on shaft 148, and connects through a chain 151 to a sprocket 152 on cam shaft 28. This provides the final connection of the rotating wipers with motor 8.

Valve Mechanism

During handling of the labels, vacuum and air must be supplied in accordance with the previously described operation of the apparatus. Thus, a valving arrangement is provided with connections to (*a*) openings 97 in slide 56, (*b*) openings 99 in deformer plates 59 and 100 in spears 94, (*c*) openings 102 in heater face plate 101, (*d*) openings 108 in slide fork 107, and (*e*) openings 112 in floating fork 111.

Vacuum is created by pump 11, while compressed air is supplied by pump 12, each having lines 153 and 154, respectively, which extend into chamber 149.

A vacuum valve assembly is disposed between spaced collars 155 which are fixedly mounted at one end of shaft 148 (FIGS. 4 and 20–23). Spaced from outer collar 155 is an annular valve plate 156 which is mounted for clockwise rotation with the shaft by a pin 157 which extends through the shaft and through slots 158 in plate 156. The inner face of plate 156 is adapted to ride against an annular valve base 159 which is loosely mounted on shaft 148. Base 159 is prevented from rotating by a radial adjusting pin 160 which extends from the circumferential edge of base 159 into a horizontally slotted adjusting block 161. Pin 160 is adjustable radially and fixed in position by a set screw 162 in base 159. The end of pin 160 within the block slot is rounded, and block 161 is adjustable vertically with a nut plate 163 secured to frame 1 by an adjustment bolt 164.

Vacuum line 153 connects through base 159 to three openings in the face thereof. Openings 165 and 166 are diametrically opposed on a relatively small radius with opening 166 being substantially smaller than opening 165, for purposes to be described. A third large vacuum opening 167 on a larger radius is disposed slightly counterclockwise from opening 165.

A line 168 from deformer plates 59 connects to an opening 169 in base 159 which is disposed circumferentially between openings 165 and 167, and on the same radius as the latter. In addition, a line 170 from heater face plate 101 connects to an opening 171 disposed slightly counterclockwise of and on the same radius as opening 166.

The vacuum connection to deformer plates 59 is made through an arcuate groove 172 disposed in valve plate 156 on the same radius as openings 167 and 169 and which connects the openings during a portion of rotation of the plate.

Similarly, the vacuum connection to heater face plate 101 is made through an arcuate groove 173 in valve plate 156 on the same radius as openings 165, 166 and 171. Groove 173 is such as to initially connect openings 165 and 171 to supply relatively high vacuum force at face plate 101. Shortly thereafter, the openings are disconnected, but vacuum remains in line 170 since a label is on the face plate. Continued rotation of valve plate 156 connects openings 166 and 171, but the vacuum force is substantially lower. For this purpose, opening 166 is relatively small.

In addition, line 153 adjacent opening 166 is provided with a vacuum reducer comprising a reduced orifice 174 in the line passageway, and a small vent plug 175 on the valve side of the orifice.

As previously described, a blast of compressed air replaces the low vacuum at heater face plate 101 to assist transfer of a label 53 to fork 107. For this purpose, a two-way valve 176 is mounted adjacent the periphery of plate 156, with the valve being connected to line 154 and also to a line 177 which connects to heater face plate 101. Valve 176 is actuated by an arcuate cam 178 secured to the periphery of plate 156, and which engages a lever 179 which in turn engages a valve plunger 180 to connect the air lines together.

It can thus be seen that rotation of valve plate 156 provides a vacuum force to the deformer plates and heater, and compressed air to the heater at timed intervals.

As previously described, a blast of compressed air replaces the vacuum at deformer plates 59 just prior to lowering of slide 56. In addition, air is supplied at spear openings 100. For this dual purpose, an annular cam retainer 181 is mounted inwardly of base plate 159 and secured for rotation with shaft 148 by a pin 182 which extends through the shaft and through slots 183 in the retainer. A two-way valve 184, similar to valve 176, is mounted adjacent the periphery of retainer 181, with the valve being connected to line 154 and also to a line 185 which connects to both deformer plates 59. Line 185 also connects to spear openings 100. Valve 184 is actuated by an arcuate cam 186 secured to the periphery of retainer 181 and which engages a lever 187 which in turn engages a valve plunger 188 to connect the air lines together at timed intervals.

A second vacuum valve base 189 is disposed adjacent retainer 181 and mounted loosely on shaft 148. Base 189 is prevented from rotating by a radial adjusting pin 190 which extends from the circumferential edge of base 189 into a horizontally slotted adjusting block 191. Pin 190 is adjustable radially and fixed in position by a set screw 192 in base 189. The end of pin 190 within the block slot is rounded, and block 191 is adjustable vertically with a nut plate 193 secured to the wall of housing 149 by an adjustment bolt 194.

A second annular valve plate 195 is disposed between base 189 and inner collar 155 and is mounted for rotation with shaft 148 by a pin 196 which extends through the shaft and through slots 197 in plate 195. The outer face of plate 195 is adapted to ride against the inner face of base 189.

Vacuum line 153 connects through base 189 to a pair of openings 198 and 199 in the face thereof. Openings 198 and 199 are disposed in radial relationship, with opening 198 being on the smaller radius. In addition, a line 200 from slide and fork openings 97 and 108 connects to an opening 201 in base 189 which is disposed clockwise from opening 199 and on the same radius. Furthermore, a line 202 from floating fork 111 connects to an opening 203 in base 189 which is disposed clockwise from opening 201 and on the same radius as opening 198.

The simultaneous vacuum connection to the slide and fork openings 97 and 108 is made through an arcuate groove 204 disposed in valve plate 195 on the same radius as openings 199 and 201 and which connects the openings during a portion of rotation of the plate.

Similarly, the vacuum connection to floating fork 111 is made through an arcuate groove 205 in valve plate 195 on the same radius as openings 198 and 203 and which connects the openings during a portion of rotation of the plate.

As previously described, a blast of compressed air replaces the vacuum at slide and fork openings 97 and 108 at the time of transfer of a label therefrom. For this purpose, a two-way valve 206, similar to valves 176 and 184 is mounted adjacent the periphery of plate 195, with the valve being connected to line 154 and also to a line 207 which connects to openings 97 and 108. Valve 206 is actuated by an arcuate cam 208 secured to the periphery of plate 195 and which engages a lever 209 which in turn engages a valve plunger 210 to connect the air lines together.

It can thus be seen that rotation of valve plate 195 provides a vacuum force and compressed air to openings 97 and 108, and a vacuum force to floating fork 111 at timed intervals.

To prevent leakage of air in the vacuum valve assembly, all of the elements mounted on shaft 148 are biased toward inner collar 155 by a compression spring 211 mounted between outer collar 155 and valve plate 156. Axial movement of plates 156 and 195, and retainer 181 is permitted by slots 158, 197 and 183, respectively.

In addition, axial movement of bases 159 and 189 is permitted by pins 160 and 190 riding in the horizontal slots of adjusting blocks 161 and 191, respectively. It may be necessary for proper timing of the vacuum-air sequence to adjust the relative radial positions of bases 159 and 189. This is done by raising or lowering blocks 161 and 191 which will correspondingly move pins 160 and 190.

*Machine Cycle*

Figure 24:
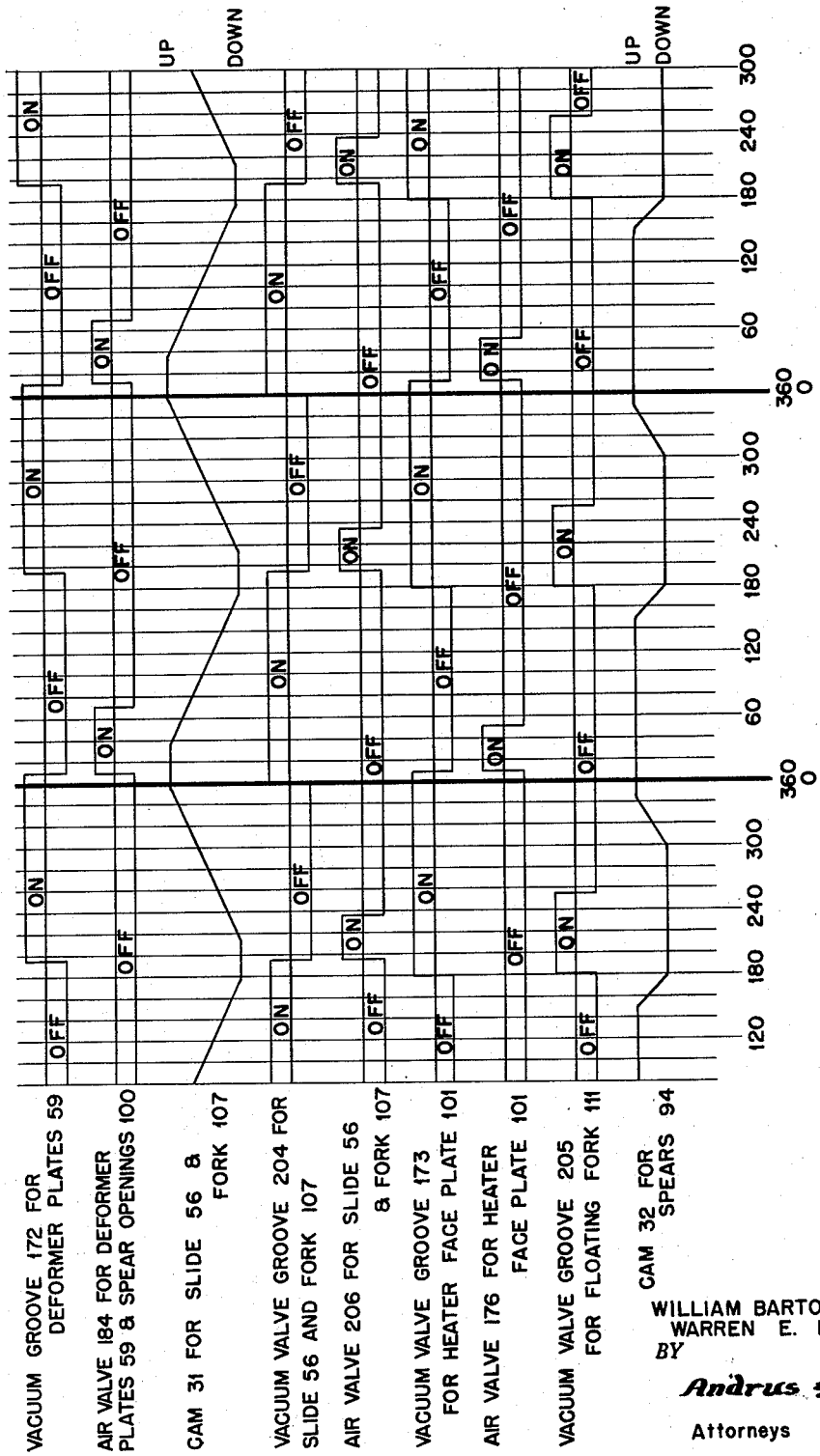
FIG. 24 is a timing cycle diagram of the machine.

A complete timing cycle of the machine is shown diagrammatically in FIG. 24 of the drawings. The diagram actually plots by degrees the cam groove surfaces of cams 31 and 32; plus the action of vacuum valve plate grooves 172, 173, 204 and 205 as well as the operating position of valves 176, 184 and 206.

Starting with the 0° line marking, vacuum is on at deformer plates 59 and heater 102 so one label is fully held away from the magazine and one is being heated. Vacuum is just initiated at slide 56 and fork 107. Slide 56 is up, and so are spears 94.

Shortly thereafter, at 10°, vacuum is switched to compressed air at deformer plates 59 and spear openings 100 and also simultaneously at heater 102 to remove the labels therefrom. At 30°, slide 56 begins to move downwardly, carrying an upper label at openings 97 and a lower label at fork openings 108. After a portion of the downward stroke, at 50°, the compressed air is switched off at heater 102, since no label is now adjacent thereto. At 70°, compressed air is shut off at deformer plates 59 and spears 94.

As slide 56 approaches the bottom of its stroke, between 150° and 180°, spears 94 retract downwardly from in front of magazine 6. At 180°, slide 56 has reached bottom, vacuum is again applied at heater 102 and at floating fork 111.

Shortly thereafter, at 195°, vacuum is applied at deformer plates 59, and vacuum is replaced with compressed air at slide openings 97 and fork openings 108. When the slide is down, plates 59 will pull the vertical side edges of the next label from the magazine and hold them against the upper portion of the slide. At the same time, the compressed air at openings 97 and 108 assists transfer of one label to heater 102 and another label to floating fork 111.

At 210°, slide 56 starts upwardly, and the apparatus is so timed that a bottle 4 will contact a label at fork 111 at 225°. At 235°, the compressed air is shut off at openings 97 and 108, and at 255°, the vacuum at floating fork 111 will be shut off since the bottle has already pulled the label therefrom.

Between 300° and 345°, spears 94 will raise to separate the end label, which is now held by deformer plates 59, from the next adjacent label. At 360°, slide 56 has reached the top of its stroke and vacuum is again applied to now secure the central portion of the top label at slide openings 97 in preparation for subsequent release of the label from plates 59 and lowering of the slide.

The invention provides novel apparatus for removing labels from a magazine, treating them when necessary, and applying them to a suitable article. Means are provided to true the labels to the articles, and to subsequently wrap the trued labels around a portion thereof. All of the elements of the apparatus, including the table 18 and wipers 134, are timed to operate in synchronism with each other.

Various modes of carrying out the invention are contemplated as being within the scope of the following claims particularly pointing out and distinctly claiming the subject matter which is regarded as the invention.

1. An apparatus for applying labels having a face treated with an adhesive material to a plurality of articles moving along a predetermined path, comprising:
   supply means to support and feed a pack of labels,
   deformer means disposed adjacent said supply means for deforming a pair of opposite edge portions of one end label away from the next adjacent label to form a space therebetween,
   positive label separating means adapted to enter said space,
   a device for activating said treated face so that it becomes tacky,
   a label support disposed adjacent the path of said articles,
   transfer means to move the said one end label from adjacent said supply means to said device and hence to said label support,
   truing means to position the label support and label in accordance with the dimensions of an oncoming article,
   first wiper means disposed in the path of said articles to secure the central portion of the label to the forward portion of the article periphery,
   and second wiper means disposed in the path of said articles to subsequently secure the label to the trailing portion of the article periphery.

2. The apparatus of claim 1 in which the deformer means comprises:
   a deformer plate disposed adjacent each of said opposite edge portions of the said one end label and inclined away from the latter,
   and vacuum means to pull the said opposite edge portions onto said plates.

3. The apparatus of claim 2 in which the positive label separating means comprises:
   a plurality of spears operable in timed relationship with the said vacuum means to enter the space created by deformation of the said opposite edge portions of the said one end label in a direction away from the next adjacent label.

4. The apparatus of claim 1 in which:
   the treated face activating device comprises a heated surface disposed adjacent the said transfer means,
   and air flows means to move a label back and forth between the transfer means and said surface.

5. The apparatus of claim 1 in which:
   the label support comprises a downwardly extending fork disposed transversely of the article path and with the prongs thereof spaced to permit an article to pass therebetween.

6. The apparatus of claim 5 in which the truing means comprises:
   a floating support for the said fork which permits movement thereof only transverse to the article path,
   and a locator member secured to the floating support and disposed for contact by an oncoming article, said locator member being normally positioned in accordance with the minimum dimensional tolerances of the articles.

7. The apparatus of claim 1 in which the second wiper means comprises:
   a plurality of relatively rigid members spaced along the article path and disposed to sequentially engage the respective trailing ends of the labels and wipe them on to the article in a line contact relationship.

8. In an apparatus for applying labels to a plurality of articles, the combination of:
   a label transfer apparatus,
   a plurality of downwardly inclined label pack support rods disposed with the lower ends of said rods being spaced from said apparatus,
   and means operable in synchronism with said label transfer apparatus to rock said rods so that frictional resistance between the rods and pack will be reduced.

9. In an apparatus for applying labels to a plurality of articles, the combination of:
   a label transfer apparatus,
   a plurality of downwardly inclined label pack support rods disposed with the lower ends of said rods being spaced from said apparatus,
   and a guide rail extending in the same direction as each rod and disposed closely adjacent thereto, each said rail having a horizontal end portion disposed between said label transfer apparatus and the end of the respective rod so that the forward portion of the pack will be supported on said rails.

10. The apparatus of claim 9 in which:
    the end of each rail is beveled to reduce the friction to a minimum between the forward end portion of the pack and the rails.

11. In an apparatus for applying labels to a plurality of articles, the combination comprising:
    a support for a pack of labels,
    a label transfer apparatus disposed at one end of said support,
    means for feeding said pack along said support toward said transfer apparatus,
    means for first deforming a pair of opposed edge portions of the end label in the pack which is adjacent said transfer apparatus,
    means for positively separating the deformed edge portions of the said end label from the next adjacent label,
    and means for subsequently securing the said end label to said transfer apparatus for subsequent complete removal from adjacent the pack.

12. The apparatus of claim 11 which includes:
    means to supply and direct an air jet to between the center portions of the said end label and next adjacent label.

13. The apparatus of claim 12 in which:
    the positive separating means comprises a plurality of spears adapted to enter the spaces created by deformation of the said end label,
    and the said air jet is directed from the end portions of the spears.

14. The apparatus of claim 11 in which the deforming means comprises:
    a supporting surface on said transfer means disposed parallel to and adjacent the central portion of the said end label,
    a wall tapering away from each end edge of said surface and away from said end label,
    and vacuum means to attract the label over said surface and onto said walls so that the edges of the said end label bend forwardly of the center thereof.

15. The apparatus of claim 14 in which:
    the positive separating means operates in timed relationship with the vacuum means and comprises a plurality of spears adapted to enter the spaces created by deformation of the said end label.

16. In an apparatus for applying labels to a plurality of articles, the combination comprising:
    a support for a pack of labels,
    a movable label transfer member disposed adjacent one end of the said support,
    a deformer plate disposed at each edge of said transfer member and inclined away from said support, a plurality of air flow openings disposed in said transfer member and in the deformer plates,
a source of vacuum,
first valve means for selectively connecting said source with said openings,
a source of compressed air,
second valve means operable in timed relationship with said first valve means for selectively connecting the second-named source with the openings in said deformer plates,
means for positioning said transfer member so that its openings are selectively adjacent the deformer plate openings,
said first valve means being operable to hold an end label from said pack on said plates and on said transfer member with a pair of opposite edge portions thereof deformed away from the next adjacent label in the pack to create a space therebetween,
and spear means operable in timed relationship with both said valve means and adapted to enter said space to positively separate the said end and next adjacent labels,
both said valve means being operable to subsequently separate the said end label from the deformer plates.

17. In an apparatus for applying heat seal labels having a thermoplastic substance thereon to articles, the combination comprising:
a heater member having a heated label receiving surface with a plurality of air flow openings therein,
a slide having two sets of air flow openings therein with said sets being spaced from each other along the length of the slide,
a source of vacuum,
first valve means for selectively connecting all of said openings with said source,
a source of compressed air,
a second valve means for selectively connecting all of said openings with said second-named source,
a label magazine;
means to move said slide so that at one position thereof one set of openings is adjacent said magazine and the other set is adjacent the openings in said heated surface, and at another position thereof said one set is adjacent the openings in said surface;
said first and second valve means being timed with the slide moving means so that labels are secured to said slide during movement thereof and so that a label is transferred to and from said surface for heating.

18. In an apparatus for applying labels to articles, the combination comprising:
a member having a label receiving surface,
said surface having a plurality of vacuum openings therein which are joined by vacuum spreading grooves,
transport means to move a label to adjacent said surface,
a source of vacuum,
and a valve operable in timed relationship with said transport means and selectively connecting said source with said openings and grooves to transfer a label from said transport means and hold the label by vacuum on said surface,
said valve including means to reduce the amount of vacuum at said surface after transfer of the label thereto to prevent distorting of the label into said grooves.

19. In an apparatus for applying labels in succession to a line of articles moving along a predetermined path, said articles varying dimensionally from each other, the combination comprising:
a support,
means for suspending said support across said path and permitting movement of the support in a transverse plane,
a fork on said support and with said fork having prongs extending downwardly on each side of said path for holding a label in said plane across said path for pick-up engagement by an article,
and a member fixed on said support on the line side of said fork and disposed for passage of an article therethrough,
said member being normally positioned in accordance with minimum dimensional tolerances of the article so that as any article with more than the minimum tolerance passes through the member, the label will be adjusted accordingly in said plane prior to pickup.

20. In an apparatus for applying labels in succession to a plurality of articles moving along a predetermined path, the combination comprising:
a support extending over said path,
a fork comprising prongs extending downwardly from said support and spaced on each side of said path,
said prongs having a plurality of vacuum openings therein for holding a label in a transverse plane across said path so that an article will pick up a label by passing between said prongs,
a source of vacuum,
and valve means for connecting said openings with said source,
said valve means being timed to maintain a vacuum at the openings before label pick-up to hold the label on the fork,
said valve means also being timed to maintain a vacuum at the openings during label pick-up to provide a pulling force between the article and label.

21. The apparatus of claim 20 in which:
the openings in each prong are vertically disposed and are connected by vertical vacuum spreading grooves.

22. In apparatus for applying labels in succession to a plurality of articles moving along a predetermined path, the combination comprising:
a support extending over said path,
a first fork extending downwardly from said support and in a plane transverse to said path,
a second fork movable into general overlapping relationship with said first fork and in the same plane,
holding means to secure a label to said second fork so that when the forks are overlapping the label is in said plane,
said transfer means to change securement of the label from said second fork to said first fork while maintaining the label in said plane.

23. The apparatus of claim 22 in which the holding and transfer means comprises:
a plurality of air flow openings in each fork,
a source of vacuum,
a source of compressed air,
and valve means operable to selectively connect and disconnect the openings in each fork with each said source,
said valves being timed to switch from vacuum to compressed air at said second fork when vacuum is connected at said first fork.

24. In an apparatus for wrapping labels around articles traveling in a predetermined path, the combination comprising:
means to attach the central portion of a label to the advancing peripheral portion of an article,
means to wipe the label around the advancing central peripheral portion of the article,
means to wipe one end of the label around the following peripheral portion of the moving article,
and means to subsequently wipe the other end of the label around said following peripheral portion.

25. The apparatus of claim 24 in which:
the first-named wiping means comprises a resilient member disposed on each side of the article path and adapted to frictionally engage and pull the label as the article passes therebetween;

and the second and third named wiping means comprises a plurality of relatively rigid member spaced along the article path and disposed to engage the respective ends of the labels and wipe them onto the article in a line contact relationship.

26. In an apparatus for wrapping labels around articles traveling in a predetermined path, said apparatus having means for applying a central portion of the label to the advancing peripheral portion of the articles; wiper means for subsequently wiping the remainder of a label to the trailing peripheral portion of the article, said wiper means comprising:
 a first rotatable shaft mounted on one side of the article path,
 a second shaft rotatable in the opposite direction of said first shaft and mounted on the other side of said path and spaced therealong from said first shaft,
 at least one wiper mounted for rotation with each shaft and adapted to extend into said path,
 stop means rotatable with each shaft for engagement by the labeled advancing periphery of the bottle,
 and means to advance said wipers into wiping engagement with the remaining free ends of the label, and to subsequently retract said wipers.

27. The apparatus of claim 26 in which the last-named means comprises:
 a wiper support rod rotatable in a bracket secured for rotation with the respective shaft,
 a lever secured to said rod,
 and a fixed cam engageable by said lever to rotate said rod about its axis as the shaft rotates.

28. In an apparatus for applying labels to articles, the combination comprising:
 a member having a label receiving surface;
 transfer means adapted to carry a label to adjacent said surface;
 vacuum means operable on each side of said label for selectively securing the latter to said transfer means or said surface, said vacuum means comprising:
 a source of vacuum,
 a plurality of air flow openings in said transfer means and in said surface,
 and valve means for selectively connecting said openings with said source;
 and compressed air means operable on each side of said label for selectively transferring the label between said transfer means and said surface, said compressed air means comprising:
 a source of compressed air,
 and valve means for selectively connecting said openings with the second-named source;
 both said valve means being operable in timed relationship with said transfer means.

References Cited in the file of this patent
UNITED STATES PATENTS

| | | |
|---|---|---|
| 707,738 | Warren | Aug. 26, 1902 |
| 1,271,989 | Anderson | July 9, 1918 |
| 2,005,802 | Oslund | June 25, 1935 |
| 2,506,963 | Magnusson | May 9, 1950 |
| 2,613,008 | Ouellette | Oct. 7, 1952 |
| 2,703,660 | Von Hofe et al. | Mar. 8, 1955 |
| 2,983,398 | Carter | May 9, 1961 |